United States Patent [19]

Brown et al.

[11] 3,950,248

[45] Apr. 13, 1976

[54] FLUID FILTERING DEVICE

[75] Inventors: Carl A. Brown; Martin K. Kleine, both of West Bloomfield, Mich.

[73] Assignee: Parker-Hannifin Corporation, Cleveland, Ohio

[22] Filed: Apr. 11, 1974

[21] Appl. No.: 460,101

[52] U.S. Cl................ 210/90; 116/70; 116/117 R; 210/91; 210/133; 210/239
[51] Int. Cl.²........................................ B01D 35/14
[58] Field of Search............ 116/70, 117 R; 210/90, 210/91, 130, 133, 232, 239, 240

[56] References Cited
UNITED STATES PATENTS

| | | | |
|---|---|---|---|
| 1,088,817 | 3/1914 | Graham | 116/70 X |
| 2,056,756 | 10/1936 | Wiedhofft | 210/133 |
| 3,080,972 | 3/1963 | Smith | 210/90 |
| 3,420,375 | 1/1969 | Kudlaty et al. | 210/90 |
| 3,431,883 | 3/1969 | Kudlaty | 210/90 X |
| 3,855,127 | 12/1974 | Nakajima et al. | 210/90 |

FOREIGN PATENTS OR APPLICATIONS

| | | | |
|---|---|---|---|
| 542,962 | 3/1956 | Italy | 210/130 |

*Primary Examiner*—Charles N. Hart
*Assistant Examiner*—Robert G. Mukai
*Attorney, Agent, or Firm*—Gifford, Chandler & Sheridan

[57] ABSTRACT

A fluid filter has a fluid inlet, a fluid outlet, and a filter element in the fluid pathway, and is provided with a by-pass which includes a fluid pressure indicator. The by-pass comprises a cylinder attached to a cover and removable therewith. The cylinder has one aperture which provides fluid communication between the cylinder and the inlet and has another aperture which, when open, provides fluid communication between the cylinder and the outlet and hence provides a fluid pathway between the inlet and outlet which by-passes the filter element. A piston is movable within the cylinder responsively to fluid pressure from a first position where it closes the second aperture to a second position where the second aperture is open. The cylinder can be removed and mounted in a first position which provides both an indicating and a by-pass function or it can be rotated to a second position which provides only an indicating function.

2 Claims, 5 Drawing Figures

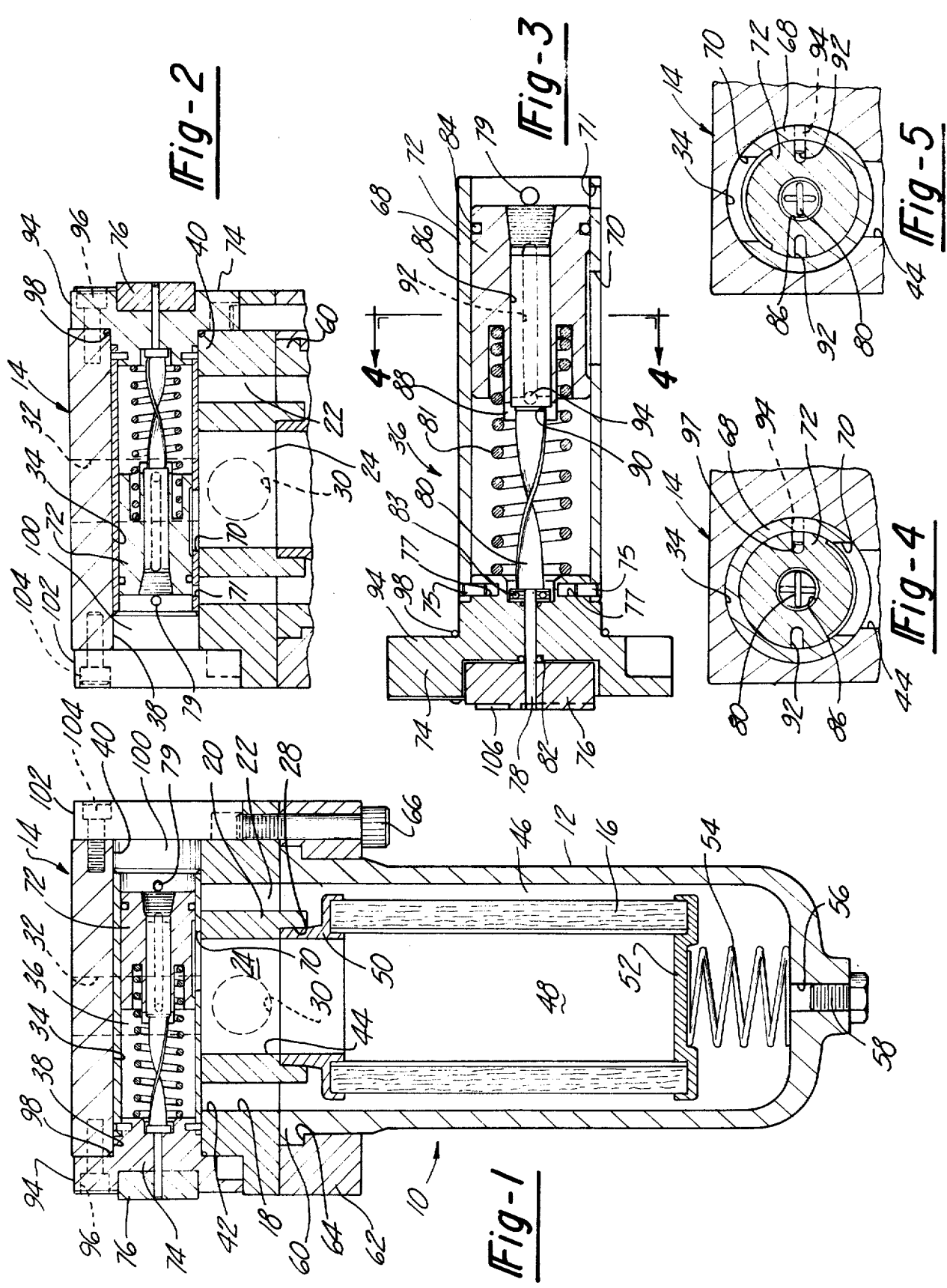

FLUID FILTERING DEVICE

BACKGROUND OF THE INVENTION

1. Field of the Invention

The invention relates to fluid filtering devices and particularly to fluid filtering devices including by-pass and fluid pressure indicating means.

2. Description of the Prior Art

Filter devices having means to indicate the pressure drop across the filter element and thus the degree of clogging of the element are not new. Most of these devices also include means operable to open a by-pass path around the filter element upon the filter element becoming clogged a predetermined amount.

In some installations it is not desirable to have the by-pass function because it is essential that contaminants be prevented from passing into the system.

SUMMARY OF THE INVENTION

The present invention provides a filtering device capable of being readily converted from a filtering device having an indicating and by-passing means to one in which filter element conditions are visually indicated but in which no by-pass occurs. All that is necessary is that a cylinder which carries the by-pass and the indicating piston be removed along with a cap that is attached to it. The cylinder is removed from the cap and rotated and fixed at a new position 180° from its original position. The assembly is then reinstalled in the filter device and will perform an indicating function as before but will not open a by-pass path regardless of the degree of clogging of the filter element.

The advantage of such a filter device of course is that it can be readily converted from one type to the other. This substantially increases its utility and eliminates the need to manufacture and stock two different types of filter devices.

In a preferred embodiment the device includes a cylindrical housing, a cylindrical filter element disposed coaxially in the housing, and a removable housing head. A bore having two ends open to the exterior of the device is formed through the head. The fluid inlet port and the fluid outlet port are in fluid communication with the upstream and downstream sides of the filter element, respectively.

A cartridge-type combination indicator and by-pass valve, which includes the cylinder and piston, is adapted to be coaxially inserted in the bore in either of two rotated positions and in either of the open ends of the head and a plug is adapted to be inserted in the other open end to close the bore.

DESCRIPTION OF THE DRAWINGS

A better understanding of the invention will be achieved by reference to the following drawings wherein like numerals refer to like parts throughout the several views, and in which:

FIG. 1 is a cross-sectional view of the fluid filtering device of the present invention;

FIG. 2 is a fragmentary view similar to the structure shown in FIG. 1 except that it illustrates the positioning of the by-pass valve of the invention in an alternative position;

FIG. 3 is an enlarged sectional view of a portion of the device shown in FIG. 1;

FIG. 4 is a view taken along line 4—4 of FIG. 3; and

FIG. 5 is a view similar to FIG. 4, but showing the piston in a position 180° from its position in FIG. 4.

DESCRIPTION OF THE PREFERRED EMBODIMENT

Referring to FIG. 1, there is shown a filtering device 10 adapted to be installed in a fluid carrying conduit (not shown) to filter a fluid passing therethrough. The filtering device 10 comprises a generally cylindrical filter case 12 removably connected to a case head 14 and a generally cylindrical filter element 16 removably disposed within the case 12.

The case head 14 comprises a depending cylindrical boss 20 disposed within and separating a pocket 18 into an annular pocket 22 and a central pocket 24. The boss 20 includes an annular shoulder 28 for locating the annular seat 50 of the filter element 16. The head 14 is also provided with a fluid inlet port 30 open to the annular pocket 22 and a fluid outlet port 32 open to the central pocket 24. The inlet port 30 and the pocket 22 form a fluid inlet passage while the outlet port 32 and the pocket 24 form a fluid outlet passage. An open ended bore 34 is formed through the head 14 generally perpendicular to the longitudinal axis of the case 12 to coaxially receive a combination indicator and by-pass valve 36.

The bore 34 is open to the exterior of the device 10 at its opposite ends 38 and 40, is open to the annular pocket 22 by means of an annular inlet 42, and is open to the central pocket 24 at an intermediate portion of the bore 34 by means of an outlet aperture 44.

The filter element 16 divides the hollow interior of the case 12 into an annular chamber 46 and a central chamber 48. The annular pocket 22 registers with the annular chamber 46 and the central pocket 24 registers with the central chamber 48. Thus, the inlet port 30 is in fluid communication with the outside surface of the filter element 16 via pocket 22 and the chamber 46; and the outlet port 32 is in fluid communication with the inside surface of the filter element 16 via pocket 24 and chamber 48.

The filter element 16 includes the annular seat 50 projecting from its top end which mates with the annular shoulder 28 to position the filter element 16. A bottom wall 52 closes the bottom end of the filter element. A coil spring 54 is disposed between the inner wall of the case 12 and the bottom wall 52 to bias the filter element 16 toward the head 14 forcing the annular seat 50 into engagement with the shoulder 28.

The case 12 includes a drain port 56 at its bottom end closed by a threaded plug 58. The case 12 is normally drained by removing the plug 58 prior to removal of the filter element 16.

The case 12 is secured to the head 14 by a mounting collar 62 having an annular step 64 which captively holds a flange 60 against the head 14. The collar 62 is in turn secured to the head 14 by, for example, a plurality of conventional bolts 66, only one of which is shown for clarity of the drawings.

The combination indicator and by-pass valve assembly 36 constitutes a single cartridge-like assembly which is installed in or removed from the bore 34 as a unit through either open end 38 or 40 (see FIGS. 1 and 2). As can best be seen in FIG. 3, the valve 36 comprises an open ended cylinder 68 having a first by-pass aperture 70 and a second by-pass aperture 71, a piston 72 axially slidably disposed in the cylinder 68, a cover 74 closing one end of the cylinder, and an indicator dial 76 rotatably mounted in and carried by the cover 74. The cover 74 is connected to the cylinder 68 by roll pins 75 which extend inwardly of the cylinder into appropriate retaining apertures 77 in the cover 74 to prevent the cover 74 from turning in the cylinder. Other means can of course be utilized to attach the cylinder 68 to the cover 74. All that is necessary, as will become more apparent as the description proceeds, is that these members be separable upon removal of the valve assembly 36 from the bore 34 and that cylinder 68 can be reattached to the cover 74 at a new position 180° from the original position.

A rotatable shaft 78 extends through the cover 74 axially to the cylinder 68 and is connected at one of its ends to the dial 76. A spiral actuating rod 80 interconnects the other end of the shaft 78 and the piston 72 and a coil spring 81 is disposed between the cover 74 and the piston 72 for biasing the piston 72 away from the cover 74. A stop 79 projects inwardly from the interior surface of the cylinder 68 to and abuts the piston 72 to limit its movement in a direction away from the cover 74. An O-ring seal 82 is disposed around the shaft 78 between the shaft and the cover 74 to prevent fluid leakage therebetween.

The piston 72 is provided with a sealing O-ring 84 which sealingly slidably contacts the interior wall surface of the cylinder 68 to prevent leakage between the piston 72 and cylinder 68. A clearance hole 86 is formed in the piston 72 to receive the spiral rod 80 as the piston 72 moves in the cylinder 68 toward the cover 74. The rod 80 is received through a slotted cap 88 positioned coaxially over the hole 86 at the end of the piston 72 nearest the cover 74. The slot 90 in the cap 88 engages the spiral actuating rod 80 causing the spiral rod to turn about its longitudinal axis as the piston 72 moves axially in the cylinder 68. Guide channels 92 are formed on opposite sides in the exterior wall of the piston 72 as can best be seen in FIG. 4, substantially parallel to the longitudinal axis of the cylinder 68. A guide pin 94 extends from the interior wall surface of the cylinder 68 into the channel 92 to prevent the piston 72 from rotating about its longitudinal axis as it moves.

The cover 74 includes a peripheral flange 97 which abuts the head at the open end 38 (as in FIG. 1) or 40 (as in FIG. 2) of the bore 34. The valve 36 is secured to the head 14 by, for example, conventional bolts 96 which extend through appropriate holes in the flange 97 and into appropriate threaded holes in the head 14. An O-ring seal 98 is disposed between the flange 94 and the head 14 to prevent leakage.

A plug or second cover 100 is removably attached to the head 14 at the open end 38 (as in FIG. 2) or 40 (as in FIG. 1) of the bore 34. As in FIG. 1, the plug 100 includes a peripheral flange 102 substantially identical to the peripheral flange 97 of the cover 74, and is likewise secured to the head by, for example, conventional bolts 104 which extend through appropriate holes in the flange 102 into appropriate threaded holes in the head 14.

The valve assembly 36 can be installed in the bore 34 in either of two rotated positions (see FIGS. 4 and 5). In a first position (see FIG. 4) the first by-pass aperture 70 in the cylinder 68 registers with the outlet aperture 44 to provide fluid communication between the interior of the cylinder 68 and the central pocket 24, while the annular pocket 22 is in fluid communication with the interior of the cylinder 68 via inlet aperture 42 and second by-pass aperture 71 (see FIGS. 1 and 2).

In a second position (see FIG. 5) the cylinder 68 has been rotated 180° about its longitudinal axis relative to the first position of FIG. 4. This is accomplished by removing the indicator and by-pass valve assembly 36 as a unit and driving the roll pins 75 farther into the apertures 77 to permit the cylinder 68 and the piston 72 to be rotated 180° with respect to the cover 74. The pin 94 in the channel 92 causes the piston 72 to rotate in unison with the cylinder 68. The cylinder 68 is then re-pinned to the cover 74 in the new position.

In the second position the first by-pass aperture 70 is out of registration with the outlet aperture 44, thus, preventing fluid communication between the interior of the cylinder 68 and the central pocket 24, while the annular pocket 22 remains in fluid communication with the interior of the cylinder 68 via the inlet aperture 42 and second by-pass aperture 71. Thus in the second position, the piston 72 is responsive only to the absolute pressure at the inlet aperture 42.

In operation, fluid to be filtered enters the filtering device 10 from a fluid conduit (not shown) through the inlet port 30, flows into the annular pocket 22 and then flows downwardly into the annular chamber 46 around the filter element 16. The fluid is filtered as it passes inwardly through the filter element 16 into the central chamber 48 inside the filter element 16. As the central chamber 48 fills with fluid, the fluid flows upwardly into the central pocket 24 and out the outlet port 32 to a fluid conduit (not shown).

With the valve assembly 36 installed in a first position, (see FIGS. 1, 2 and 4), and with an unclogged filter element 16, there is no significant pressure exerted by the fluid against the piston 72 to enable the piston to move against the pressure exerted by spring 81. Thus there is no open fluid pathway between annular pocket 22 and central pocket 24 except through the filter 16. However, as the filter becomes clogged a back pressure is built up in the annular chamber 46 and annular pocket 22. This back pressure is communicated to the interior of the cylinder 68 via the inlet aperture 42 and second by-pass aperture 71 causing a significant pressure on the piston 72 resulting in a pressure differential across the piston 72. As the pressure differential increases, it causes the piston 72 to move axially in the cylinder 68 to the left as shown in FIG. 1 and to the right as shown in FIG. 2. As the piston 72 moves it causes the indicator dial 76 to move by the coaction between the spiral shaft 80 and the slot 90. As the indicator dial rotates, a pointer 106 carried on the indicator dial registers with indicia (not shown) on the cover 74 to indicate the clogged condition of the filter element 16. As the pressure differential continues to increase, the piston 72 continues to move until the area behind the piston 72 registers with aperture 70 and thus outlet aperture 44. At this point, incoming fluid will pass from the inlet port 30 into the annular pocket 22, through the inlet aperture 42, and second by-pass aperture 71 into the interior of the cylinder 68, through the by-pass aperture 70 into the central pocket 24, and then out through the outlet port 32. In this manner the fluid by-passes the filter element 16.

To remove a clogged filter element 16 for cleaning or replacement, the plug 58 is removed from the drain port 56 to drain any fluid from the interior of the filter casing 12. Next, the bolts 66 are removed from the collar 62, releasing the collar 62 and filter casing 12 from the head 14.

With the valve 36 in the second position (see FIG. 5), the by-pass feature is eliminated because movement of the piston 72 does not open the inlet side of the piston 72 to the outlet aperture 44; thus, preventing fluid communication between the inlet port 30 and outlet port 32 except through the filter 16. In the second position the valve 36 functions only as an indicator as described above.

It is apparent that although we have described but one preferred embodiment of our invention many changes can be made without departing from the spirit of the invention as expressed by the scope of the appended claims.

We claim:

1. In a fluid filter device having a housing with a fluid inlet passage and a fluid outlet passage and having a filter element positioned in a fluid pathway between said inlet and outlet passages; the improvement which comprises:

- a bore in the housing communicating with said inlet passage and having an intermediate portion thereof communicating with the outlet passage and having the ends thereof closed by covers detachably connected to the housing,
- a hollow cylinder in the bore provided with a first aperture which effects fluid communication between the interior of said cylinder and said inlet passage and provided with a scond aperture which, when open, effects fluid communication between the interior of said cylinder and said outlet passage and hence provides a fluid pathway between said inlet and outlet which by-passes said filter;
- a piston mounted on guide means in said cylinder for reciprocal movement within said cylinder and adapted to move responsively to fluid pressure from a first position where it closes said second aperture to a second position where said second aperture is open;
- indicator means responsive to the position of said piston for indicating said fluid pressure;
- and said cylinder being connected to one of said covers for removal from said bore when said one cover is detached from said housing,
- wherein said cylinder is mountable in one position in said bore in which said second aperture is in register with said outlet passage to effect said communication between the interior of the cylinder and said outlet passage when the second aperture is open, and said cylinder is mountable in another position in said bore in in which said second aperture is out of register with said outlet passage so that there is no communication between the interior of the cylinder and the outlet passage when the second aperture is open, and
- wherein the one cover is attachable to the housing in a fixed position and said cylinder is attachable to said cover in either of said two mounting positions.

2. The device of claim 1 in which the cylinder is removably pinned to the one cover and may be detached from the one cover for rotation from the one mounting position to the other.

* * * * *

UNITED STATES PATENT OFFICE
CERTIFICATE OF CORRECTION

PATENT NO. : 3,950,248
DATED : April 13, 1976
INVENTOR(S) : Carl A. Brown and Martin K. Kleine It is certified that error appears in the above—identified patent and that said Letters Patent are hereby corrected as shown below:

Column 5, line 6, after "44", insert --because the bypass aperture 70 is no longer in a position to produce such communication--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*